(12) United States Patent
Kanesaka et al.

(10) Patent No.: US 11,726,372 B2
(45) Date of Patent: Aug. 15, 2023

(54) LIQUID CRYSTAL DEVICE

(71) Applicant: Japan Display Inc., Tokyo (JP)

(72) Inventors: Yuuichi Kanesaka, Tokyo (JP); Koichi Nagao, Tokyo (JP); Tomohide Oohira, Tokyo (JP); Takayuki Imai, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/499,078

(22) Filed: Oct. 12, 2021

(65) Prior Publication Data

US 2022/0113576 A1    Apr. 14, 2022

(30) Foreign Application Priority Data

Oct. 13, 2020  (JP) ................................. 2020-172578

(51) Int. Cl.
*G02F 1/1345* (2006.01)
*G02F 1/1343* (2006.01)

(52) U.S. Cl.
CPC .... *G02F 1/13452* (2013.01); *G02F 1/134309* (2013.01)

(58) Field of Classification Search
CPC ........... G02F 1/13452; G02F 1/134309; G02F 1/1345; G02F 1/13458; G02F 1/1347
See application file for complete search history.

(56) References Cited

U.S. PATENT DOCUMENTS

2008/0068315 A1* 3/2008 Kurosaki .............. G02F 1/1345
345/87
2008/0232047 A1* 9/2008 Yamada .............. G02F 1/13452
361/679.02

2012/0257131 A1    10/2012 Galstian et al.
2016/0077402 A1    3/2016 Takehara et al.
2022/0235918 A1    7/2022 Koito et al.

FOREIGN PATENT DOCUMENTS

| EP | 2138892 A1 * | 12/2009 | ........... G02F 1/1345 |
| JP | 2005202074 A | 7/2005 | |
| JP | 2008-76926 A | 4/2008 | |
| JP | 2013-515969 A | 5/2013 | |
| JP | 2016-57541 A | 4/2016 | |

OTHER PUBLICATIONS

Office Action dated Dec. 15, 2022, in corresponding German Application No. 10 2021 210 501.7, 3 pages (partial English translation provided).

* cited by examiner

*Primary Examiner* — Nathanael R Briggs
(74) *Attorney, Agent, or Firm* — Maier & Maier, PLLC

(57) ABSTRACT

According to one embodiment, a liquid crystal device includes a first liquid crystal cell, a second liquid crystal cell, a first flexible wiring board including a first terminal and connected to the first liquid crystal cell, a second flexible wiring board including a second terminal and connected to the second liquid crystal cell, and a circuit board including a first connector connected to the first terminal and a second connector connected to the second terminal. The first flexible wiring board and the second flexible wiring board are arranged without overlapping each other in plan view. A first distance from an edge of the circuit board to the first connector and a second distance from the edge to the second connector are different from each other.

13 Claims, 13 Drawing Sheets

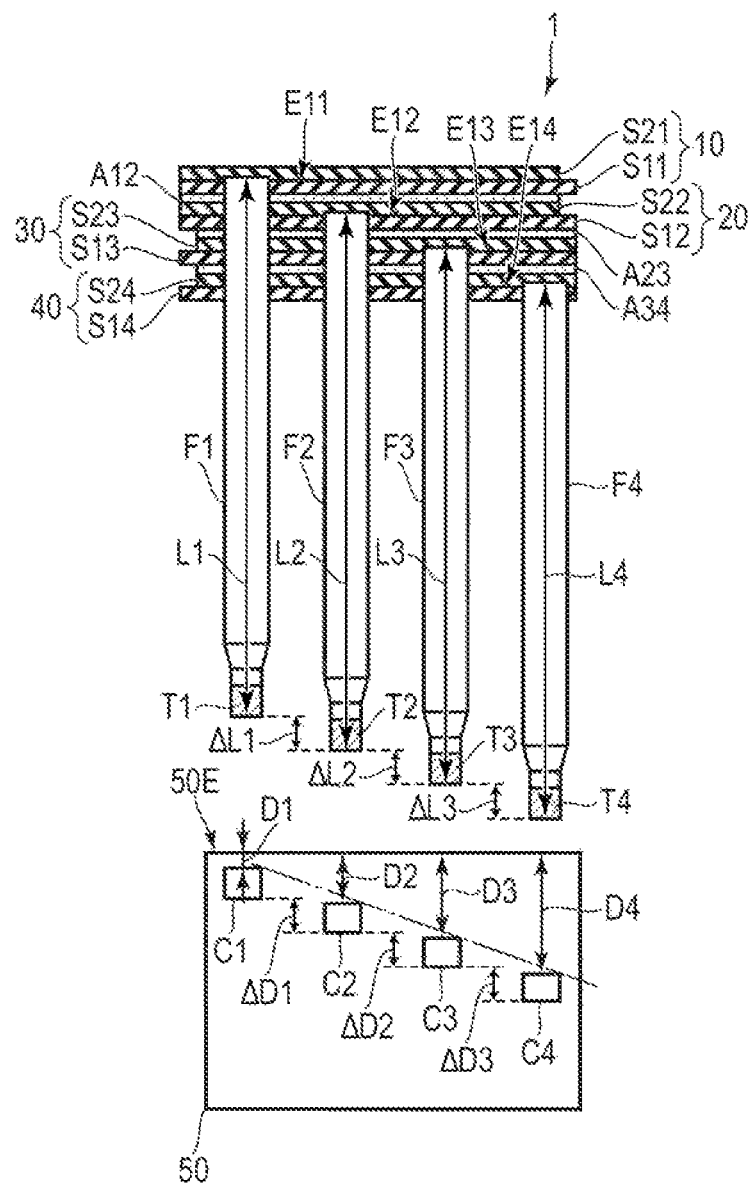
F I G. 3

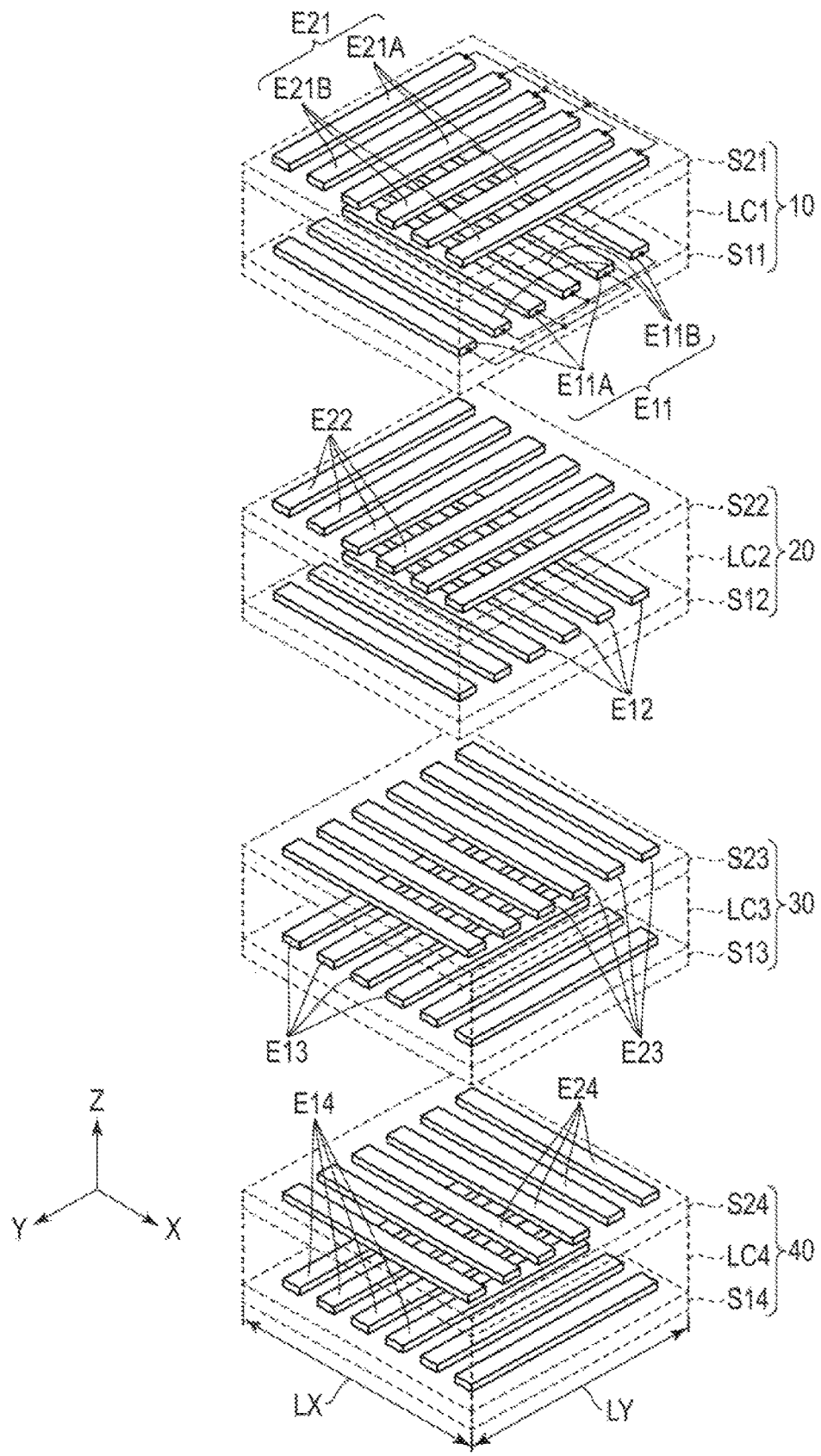
F I G. 5

LIQUID CRYSTAL DEVICE

CROSS-REFERENCE TO RELATED APPLICATION

This application is based upon and claims the benefit of priority from Japanese Patent Application No. 2020-172578, filed Oct. 13, 2020, the entire contents of which are incorporated herein by reference.

FIELD

Embodiments described herein relate generally to a liquid crystal device.

BACKGROUND

In recent years, a light control device using a liquid crystal cell has been proposed. Such a light control device mainly focuses or diverges a one-polarization component. In one example, a liquid crystal lens including a plurality of annular electrodes has been proposed. As another example, a liquid crystal lens including a transparent electrode arranged in a plurality of fan-shaped divided regions has also been proposed.

BRIEF DESCRIPTION OF THE DRAWINGS

FIG. 3 is a diagram illustrating a state before each of a first flexible wiring board F1, a second flexible wiring board F2, a third flexible wiring board F3, and a fourth flexible wiring board F4 is connected to a circuit board 50.

FIG. 5 is a perspective view illustrating a first liquid crystal cell 10, a second liquid crystal cell 20, a third liquid crystal cell 30, and a fourth liquid crystal cell 40.

DETAILED DESCRIPTION

Figure 1:
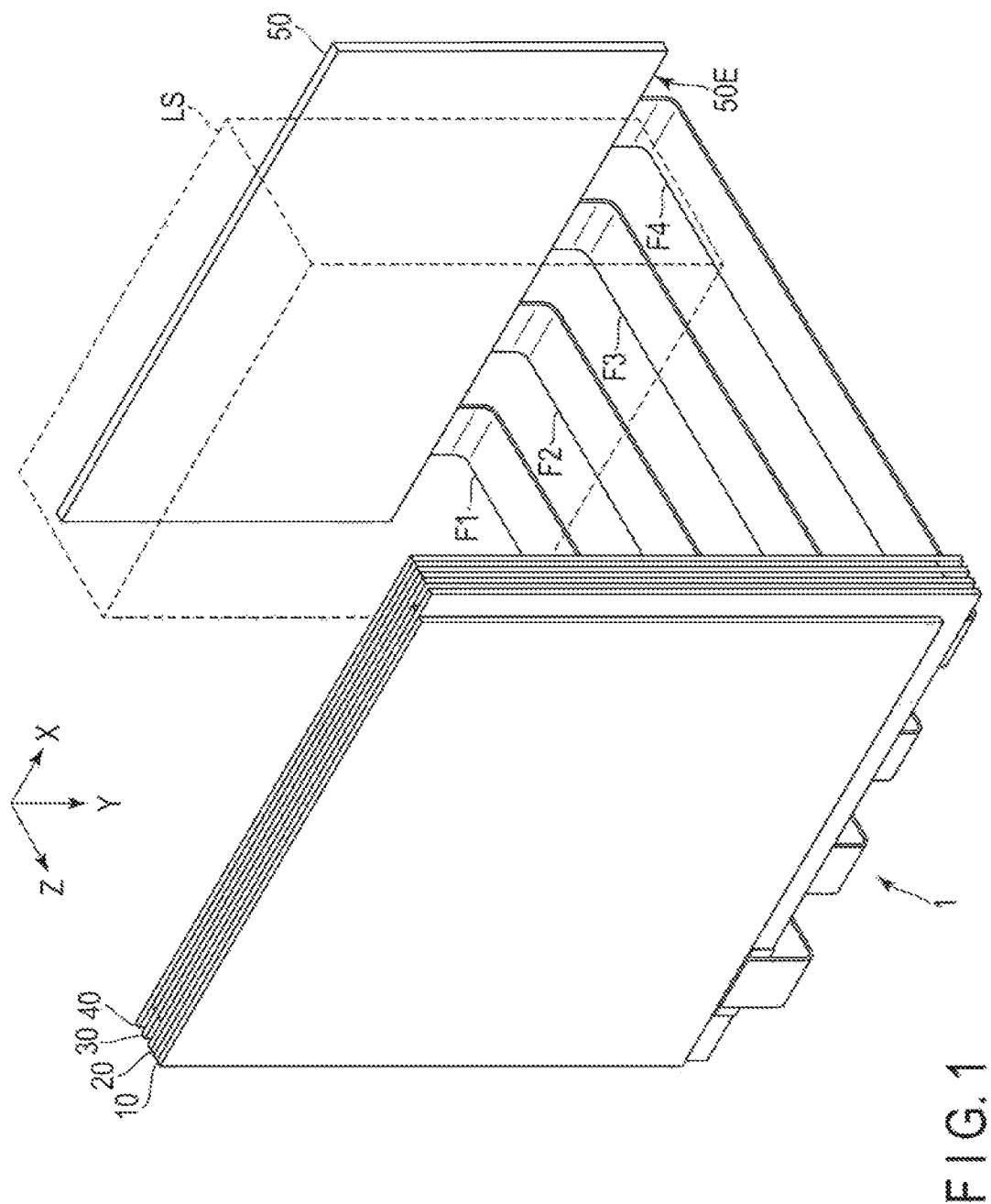
FIG. 1 is a perspective view illustrating a liquid crystal device 1 according to the present embodiment.

In general, according to one embodiment, there is provided a liquid crystal device comprising a first liquid crystal cell, a second liquid crystal cell bonded to the first liquid crystal cell, a first flexible wiring board including a first terminal and connected to the first liquid crystal cell, a second flexible wiring board including a second terminal and connected to the second liquid crystal cell, and a circuit board including a first connector connected to the first terminal and a second connector connected to the second terminal, wherein the first flexible wiring board and the second flexible wiring board are arranged without overlapping each other in plan view, and a first distance from an edge of the circuit board to the first connector and a second distance from the edge to the second connector are different from each other.

Furthermore, according to the present embodiment, there is provided a liquid crystal device comprising a first liquid crystal cell, a second liquid crystal cell bonded to the first liquid crystal cell, a third liquid crystal cell bonded to the second liquid crystal cell, a fourth liquid crystal cell bonded to the third liquid crystal cell, a first flexible wiring board including a first terminal and connected to the first liquid crystal cell, a second flexible wiring board including a second terminal and connected to the second liquid crystal cell, a third flexible wiring board including a third terminal and connected to the third liquid crystal cell, a fourth flexible wiring board including a fourth terminal and connected to the fourth liquid crystal cell, and a circuit board including a first connector connected to the first terminal, a second connector connected to the second terminal, a third connector connected to the third terminal, and a fourth connector connected to the fourth terminal, wherein the first flexible wiring board, the second flexible wiring board, the third flexible wiring board, and the fourth flexible wiring board are arranged in this order without overlapping each other in plan view, and a first distance from an edge of the circuit board to the first connector, a second distance from the edge to the second connector, a third distance from the edge to the third connector, and a fourth distance from the edge to the fourth connector are different from each other.

Furthermore, according to the present embodiment, there is provided a liquid crystal device comprising a first liquid crystal cell, a third liquid crystal cell bonded to the first liquid crystal cell, a second liquid crystal cell bonded to the third liquid crystal cell, a fourth liquid crystal cell bonded to the second liquid crystal cell, a first flexible wiring board including a first terminal and connected to the first liquid crystal cell, a second flexible wiring board including a second terminal and connected to the second liquid crystal cell, a third flexible wiring board including a third terminal and connected to the third liquid crystal cell, a fourth flexible wiring board including a fourth terminal and connected to the fourth liquid crystal cell, and a circuit board including a first connector connected to the first terminal, a second connector connected to the second terminal, a third connector connected to the third terminal, and a fourth connector connected to the fourth terminal, wherein the first flexible wiring board, the second flexible wiring board, the third flexible wiring board, and the fourth flexible wiring board are arranged in this order without overlapping each other, and a length of the first flexible wiring board, a length of the second flexible wiring board, a length of the third flexible wiring board, and a length of the fourth flexible wiring board are equal to each other, and the first connector, the second connector, the third connector, and the fourth connector are arranged in this order, and a third distance from an edge of the circuit board to the third connector is larger than a first distance from the edge to the first connector, and a second distance from the edge to the second connector is larger than the third distance, and a fourth distance from the edge to the fourth connector is larger than the second distance.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference numbers, and detailed descriptions thereof which are considered redundant are omitted where appropriate.

In the drawings, an X-axis, a Y-axis and a Z-axis which are orthogonal to each other are shown as needed for easier understanding. A direction along the X-axis is referred to as a first direction X, a direction along the Y-axis is referred to as a second direction Y, and a direction along the Z-axis is referred to as a third direction Z. A plane defined by the X-axis and the Y-axis is referred to as an X-Y plane, and viewing the X-Y plane is referred to as plan view.

FIG. 1 is a perspective view illustrating a liquid crystal device 1 according to the present embodiment.

The liquid crystal device 1 includes a first liquid crystal cell 10, a second liquid crystal cell 20, a third liquid crystal cell 30, a fourth liquid crystal cell 40, a first flexible wiring board F1, a second flexible wiring board F2, a third flexible wiring board F3, a fourth flexible wiring board F4, and a circuit board 50. The liquid crystal device 1 according to the present embodiment includes two or more liquid crystal cells, and is not limited to the configuration including the four liquid crystal cells as in the example illustrated in FIG. 1.

In a third direction Z, the first liquid crystal cell 10, the second liquid crystal cell 20, the third liquid crystal cell 30, and the fourth liquid crystal cell 40 are stacked in this order.

The first flexible wiring board F1 electrically connects the first liquid crystal cell 10 and the circuit board 50. The second flexible wiring board F2 electrically connects the second liquid crystal cell 20 and the circuit board 50. The third flexible wiring board F3 electrically connects the third liquid crystal cell 30 and the circuit board 50. The fourth flexible wiring board F4 electrically connects the fourth liquid crystal cell 40 and the circuit board 50.

The first flexible wiring board F1, the second flexible wiring board F2, the third flexible wiring board F3, and the fourth flexible wiring board F4 are bent along the edges of the first liquid crystal cell 10, the second liquid crystal cell 20, the third liquid crystal cell 30, and the fourth liquid crystal cell 40, respectively, and are further bent along the edge 50E of the circuit board 50. The circuit board 50 is disposed so as to face the fourth liquid crystal cell 40 in the third direction Z.

A region for disposing a light source portion LS indicated by a dotted line is secured between the circuit board 50 and the fourth liquid crystal cell 40. The light source portion LS includes at least a light source, and includes an optical element such as a lens between the light source and the fourth liquid crystal cell 40 as necessary.

Light emitted from the light source portion LS is, for example, natural light. The light emitted from the light source portion LS sequentially passes through the fourth liquid crystal cell 40, the third liquid crystal cell 30, the second liquid crystal cell 20, and the first liquid crystal cell 10. As described later, the fourth liquid crystal cell 40, the third liquid crystal cell 30, the second liquid crystal cell 20, and the first liquid crystal cell 10 are configured to diffuse a part of polarization components of the incident light. By combining the liquid crystal device 1 with the light source portion LS in this manner, it is possible to provide an illumination device capable of changing a light diffusion direction.

Figure 2:
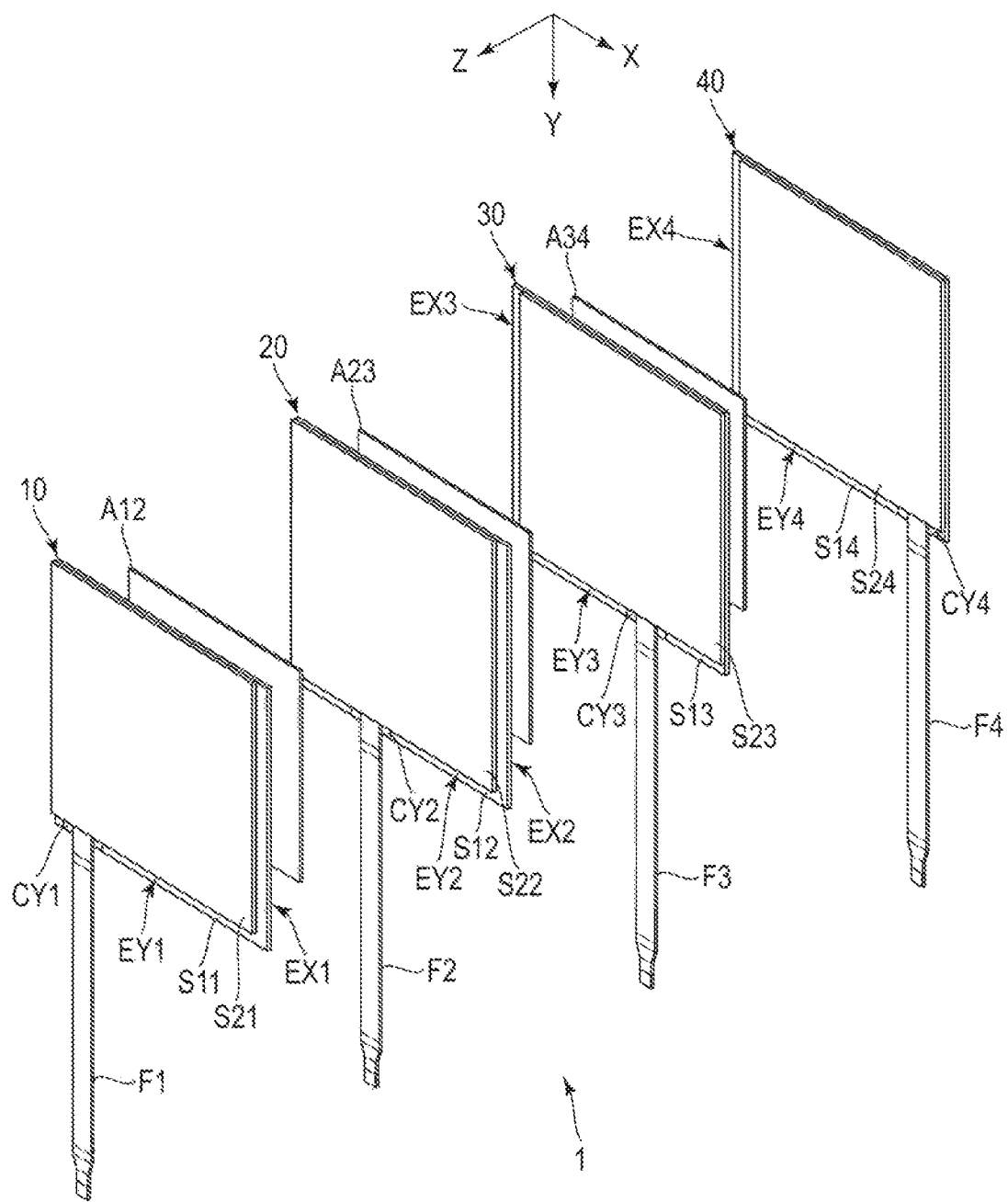
FIG. 2 is an exploded perspective view showing the liquid crystal device 1 illustrated in FIG. 1.

FIG. 2 is an exploded perspective view illustrating the liquid crystal device 1 illustrated in FIG. 1. FIG. 2 illustrates a state before each of the first flexible wiring board F1, the second flexible wiring board F2, the third flexible wiring board F3, and the fourth flexible wiring board F4 is bent. Further, illustration of the circuit board 50 is omitted.

The first liquid crystal cell 10 includes a first substrate S11 and a second substrate S21. The first substrate S11 includes an extending portion EX1 extending outward from the second substrate S21 along a first direction X and an extending portion EY1 extending outward from the second substrate S21 along a second direction Y. The extending portion EY1 includes a connecting portion CY1 connected to the first flexible wiring board F1.

The second liquid crystal cell 20 includes a first substrate S12 and a second substrate S22. The first substrate S12 includes an extending portion EX2 extending outward from the second substrate S22 along the first direction X and an extending portion EY2 extending outward from the second substrate S22 along the second direction Y. In the third direction Z, the extending portion EX2 overlaps the extending portion EX1, and the extending portion EY2 overlaps the extending portion EY1. The extending portion EY2 includes a connecting portion CY2 connected to the second flexible wiring board F2.

Third liquid crystal cell 30 includes a first substrate S13 and a second substrate S23. The first substrate S13 includes an extending portion EX3 extending outward from the second substrate S23 along the first direction X and an extending portion EY3 extending outward from the second substrate S23 along the second direction Y. In the third direction Z, the extending portion EY3 overlaps the extending portion EY2. The extending portion EX3 does not overlap the extending portion EX2 and is located on the opposite side of the extending portion EX2. The extending portion EY3 includes a connecting portion CY3 connected to the third flexible wiring board F3.

The fourth liquid crystal cell 40 includes a first substrate S14 and a second substrate S24. The first substrate S14 includes an extending portion EX4 extending outward from the second substrate S24 along the first direction X and an extending portion EY4 extending outward from the second substrate S24 along the second direction Y. In the third direction Z, the extending portion EX4 overlaps the extending portion EX3, and the extending portion EY4 overlaps the extending portion EY3. The extending portion EY4 includes a connecting portion CY4 connected to the fourth flexible wiring board F4.

A transparent adhesive layer A12 is disposed between the first liquid crystal cell 10 and the second liquid crystal cell 20. The transparent adhesive layer A12 bonds the first substrate S11 of the first liquid crystal cell 10 and the second substrate S22 of the second liquid crystal cell 20.

A transparent adhesive layer A23 is disposed between the second liquid crystal cell 20 and the third liquid crystal cell 30. The transparent adhesive layer A23 bonds the first substrate S12 of the second liquid crystal cell 20 and the second substrate S23 of the third liquid crystal cell 30.

A transparent adhesive layer A34 is disposed between the third liquid crystal cell 30 and the fourth liquid crystal cell 40. The transparent adhesive layer A34 bonds the first substrate S13 of the third liquid crystal cell 30 and the second substrate S24 of the fourth liquid crystal cell 40.

In plan view of the X-Y plane, the connecting portion CY1, the connecting portion CY2, the connecting portion CY3, and the connecting portion CY4 are arranged in this order along the first direction X without overlapping each other. The first flexible wiring board F1, the second flexible wiring board F2, the third flexible wiring board F3, and the fourth flexible wiring board F4 are arranged in this order along the first direction X without overlapping each other.

The first flexible wiring board F1, the second flexible wiring board F2, the third flexible wiring board F3, and the fourth flexible wiring board F4 have the same configuration. That is, the length of the first flexible wiring board F1, the length of the second flexible wiring board F2, the length of the third flexible wiring board F3, and the length of the fourth flexible wiring board F4 are equal to each other. This feature will be described in detail below.

FIG. 3 is a diagram illustrating a state before each of the first flexible wiring board F1, the second flexible wiring board F2, the third flexible wiring board F3, and the fourth flexible wiring board F4 is connected to the circuit board 50.

The first flexible wiring board F1 is bent along the edge 11E of the first substrate S11. The second flexible wiring board F2 is bent along the edge 12E of the first substrate S12. The third flexible wiring board F3 is bent along the edge 13E of the first substrate S13. The fourth flexible wiring board F4 is bent along the edge 14E of the first substrate S14.

The first flexible wiring board F1 has a first terminal T1 on the opposite side of the position connected to the first substrate S11. The second flexible wiring board F2 has a second terminal T2 on the opposite side of the position connected to the first substrate S12. The third flexible wiring board F3 has a third terminal T3 on the opposite side of the position connected to the first substrate S13. The fourth flexible wiring board F4 has a fourth terminal T4 on the opposite side of the position connected to the first substrate S14.

The first flexible wiring board F1 has a length L1 from the position bent along the edge 11E to the distal end of the first terminal T1. The second flexible wiring board F2 has a length L2 from the position bent along the edge 12E to the distal end of the second terminal T2. The third flexible wiring board F3 has a length L3 from the position bent along the edge 13E to the distal end of the third terminal T3. The fourth flexible wiring board F4 has a length L4 from the position bent along the edge 14E to the distal end of the fourth terminal T4. The length L1, the length L2, the length L3, and the length L4 are equal (L1=L2=L3=L4).

Comparing the position of the distal end of the first terminal T1 with the position of the distal end of the second terminal T2, the second terminal T2 is located below the first terminal T1 by the difference $\Delta L1$. The difference $\Delta L1$ generally corresponds to the sum of the thicknesses of the first substrate S11, the transparent adhesive layer A12, and the second substrate S22.

Comparing the position of the distal end of the second terminal T2 with the position of the distal end of the third terminal T3, the third terminal T3 is located below the second terminal T2 by the difference $\Delta L2$. The difference $\Delta L2$ generally corresponds to the sum of the thicknesses of the first substrate S12, the transparent adhesive layer A23, and the second substrate S23. The difference $\Delta L2$ is equal to the difference $\Delta L1$ ($\Delta L2=\Delta L1$).

Comparing the position of the distal end of the third terminal T3 with the position of the distal end of the fourth terminal T4, the fourth terminal T4 is located below the third terminal T3 by the difference $\Delta L3$. The difference $\Delta L3$ generally corresponds to the sum of the thicknesses of the first substrate S13, the transparent adhesive layer A34, and the second substrate S24. The difference $\Delta L3$ is equal to the difference $\Delta L2$ ($\Delta L3=\Delta L2$).

The circuit board 50 includes a first connector C1 connected to the first terminal T1, a second connector C2 connected to the second terminal T2, a third connector C3 connected to the third terminal T3, and a fourth connector C4 connected to the fourth terminal T4.

A first distance D1 from the edge 50E of the circuit board 50 to the first connector C1, a second distance D2 from the edge 50E to the second connector C2, a third distance D3 from the edge 50E to the third connector C3, and a fourth distance D4 from the edge 50E to the fourth connector C4 are different from each other (D1≠D2≠D3≠D4). As described with reference to FIG. 1, the edge 50E as a reference corresponds to an edge serving as a starting point of bending of each of the first flexible wiring board F1, the second flexible wiring board F2, the third flexible wiring board F3, and the fourth flexible wiring board F4 among the edges of the circuit board 50.

In the example illustrated in FIG. 3, the first distance D1 is smaller than the second distance D2 (D1<D2). The second distance D2 is smaller than the third distance D3 (D2<D3). The third distance D3 is smaller than the fourth distance D4 (D3<D4). For example, when the first connector C1, the second connector C2, the third connector C3, and the fourth connector C4 are arranged at regular intervals, the first connector C1, the second connector C2, the third connector C3, and the fourth connector C4 are positioned on the same straight line non-parallel to the edge 50E of the circuit board 50 as indicated by a one-dot chain line.

Comparing the position of the first connector C1 with the position of the second connector C2, the second connector C2 is located below the first connector C1 by the difference $\Delta D1$. The difference $\Delta D1$ is equal to the difference $\Delta L1$ ($\Delta D1=\Delta L1$).

Comparing the position of the second connector C2 with the position of the third connector C3, the third connector C3 is located below the second connector C2 by the difference $\Delta D2$. The difference $\Delta D2$ is equal to the difference $\Delta D1$ ($\Delta D2=\Delta D1$). The difference $\Delta D2$ is equal to the difference $\Delta L2$ ($\Delta D2=\Delta L2$).

Comparing the position of the third connector C3 with the position of the fourth connector C4, the fourth connector C4 is located below the third connector C3 by the difference $\Delta D3$. The difference $\Delta D3$ is equal to the difference $\Delta D2$ ($\Delta D3=\Delta D2$). The difference $\Delta D3$ is equal to the difference $\Delta L3$ ($\Delta D3=\Delta L3$).

Figure 4:
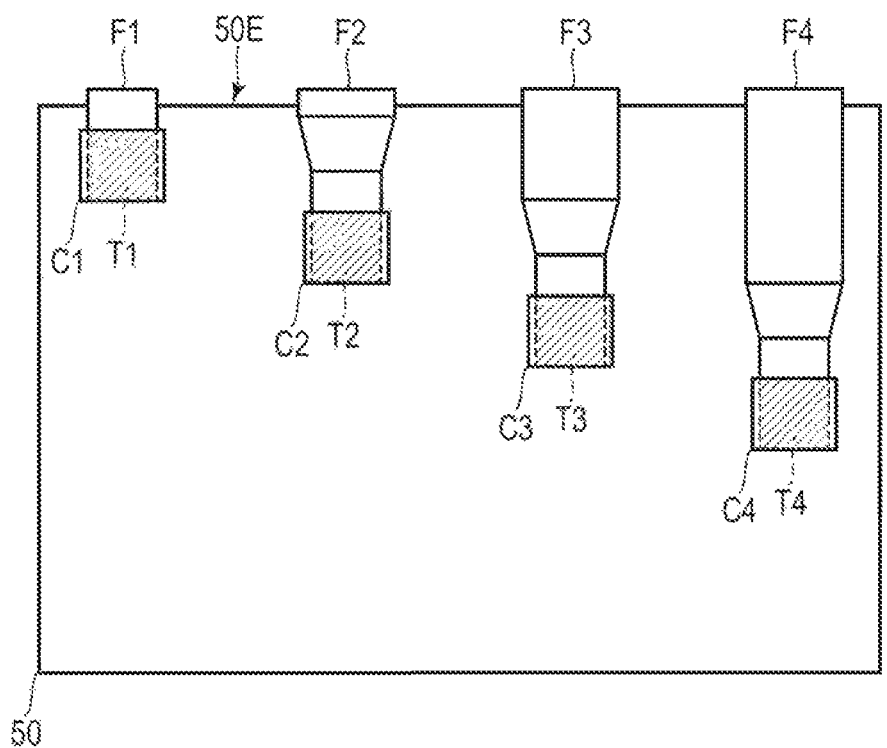
FIG. 4 is a diagram illustrating a state in which each of the first flexible wiring board F1, the second flexible wiring board F2, the third flexible wiring board F3, and the fourth flexible wiring board F4 is connected to the circuit board 50.

FIG. 4 is a diagram illustrating a state in which each of the first flexible wiring board F1, the second flexible wiring board F2, the third flexible wiring board F3, and the fourth flexible wiring board F4 is connected to the circuit board 50.

Each of the first flexible wiring board F1, the second flexible wiring board F2, the third flexible wiring board F3, and the fourth flexible wiring board F4 is bent along the edge 50E of the circuit board 50.

The first terminal T1 is connected to the first connector C1. The second terminal T2 is connected to the second connector C2. The third terminal T3 is connected to the third connector C3. The fourth terminal T4 is connected to the fourth connector C4.

According to the liquid crystal device of the present embodiment, regarding the circuit board 50, the looseness of each of the first flexible wiring board F1, the second flexible wiring board F2, the third flexible wiring board F3, and the fourth flexible wiring board F4 is suppressed as compared with the case where the first connector C1, the second connector C2, the third connector C3, and the fourth connector C4 are arranged at equal distances from the edge 50E. Therefore, stress applied from each flexible wiring board to the connecting portion of the liquid crystal cell is relieved, and the reliability can be improved.

In addition, as compared with the case where a plurality of types of flexible wiring boards having different specifications (in particular, lengths) are prepared, the cost can be reduced, and a connection error between the flexible wiring boards and the liquid crystal cells can be prevented.

The first liquid crystal cell 10, the second liquid crystal cell 20, the third liquid crystal cell 30, and the fourth liquid crystal cell 40 will be described below.

FIG. 5 is a perspective view illustrating the first liquid crystal cell 10, the second liquid crystal cell 20, the third liquid crystal cell 30, and the fourth liquid crystal cell 40.

The first liquid crystal cell 10 includes the first substrate S11, the second substrate S21, and a liquid crystal layer LC1. The liquid crystal layer LC1 is held between the first substrate S11 and the second substrate S21. The first substrate S11 includes a plurality of first electrodes E11 formed in a band shape. The plurality of first electrodes E11 extend along the first direction X and are arranged at intervals along the second direction Y. The second substrate S21 includes a plurality of second electrodes E21 formed in a band shape. The plurality of second electrodes E21 extend along the second direction Y and are arranged at intervals along the first direction X. That is, the plurality of first electrodes E11 and the plurality of second electrodes E21 intersect each other. In plan view, angles at which the first electrodes E11 intersect the second electrodes E21 are 90° or less.

The second liquid crystal cell 20 includes the first substrate S12 including a plurality of first electrodes E12, the second substrate S22 including a plurality of second electrodes E22, and a liquid crystal layer LC2. The liquid crystal layer LC2 is held between the first substrate S12 and the second substrate S22. The plurality of first electrodes E12 extend along the first direction X and are arranged at intervals along the second direction Y. The plurality of second electrodes E22 extend along the second direction Y and are arranged at intervals along the first direction X.

The third liquid crystal cell 30 includes the first substrate S13 including a plurality of first electrodes E13, the second substrate S23 including a plurality of second electrodes E23, and a liquid crystal layer LC3. The liquid crystal layer LC3 is held between the first substrate S13 and the second substrate S23. The plurality of first electrodes E13 extend along the second direction Y and are arranged at intervals along the first direction X. The plurality of second electrodes E23 extend along the first direction X and are arranged at intervals along the second direction Y.

The fourth liquid crystal cell 40 includes the first substrate S14 including a plurality of first electrodes E14, the second substrate S24 including a plurality of second electrodes E24, and a liquid crystal layer LC4. The liquid crystal layer LC4 is held between the first substrate S14 and the second substrate S24. The plurality of first electrodes E14 extend along the second direction Y and are arranged at intervals along the first direction X. The plurality of second electrodes E24 extend along the first direction X and are arranged at intervals along the second direction Y.

The first electrodes E11 of the first liquid crystal cell 10 and the first electrodes E14 of the fourth liquid crystal cell 40 are orthogonal to each other in plan view. The first electrodes E12 of the second liquid crystal cell 20 and the first electrodes E13 of the third liquid crystal cell 30 are orthogonal to each other in plan view. The first electrodes E11 of the first liquid crystal cell 10 and the first electrodes E12 of the second liquid crystal cell 20 are substantially parallel to each other in plan view. The first electrodes E13 of the third liquid crystal cell 30 and the first electrodes E14 of the fourth liquid crystal cell 40 are substantially parallel to each other in plan view.

Each of the first substrate S11 of the first liquid crystal cell 10, the first substrate S12 of the second liquid crystal cell 20, the first substrate S13 of the third liquid crystal cell 30, and the first substrate S14 of the fourth liquid crystal cell 40 is formed in a square shape and has an equivalent size. That is, the first substrates S11 to S14 have the same length LX along the first direction X and the same length LY along the second direction Y. The length LX is equal to the length LY (LX=LY).

Therefore, when the first liquid crystal cell 10, the second liquid crystal cell 20, the third liquid crystal cell 30, and the fourth liquid crystal cell 40 are bonded to each other, as illustrated in FIG. 1, the edges along the first direction X overlap, and the edges along the second direction Y also overlap.

The first liquid crystal cell 10, the second liquid crystal cell 20, the third liquid crystal cell 30, and the fourth liquid crystal cell 40 have substantially the same configuration. Hereinafter, the first liquid crystal cell 10 will be described more specifically as a representative.

The plurality of first electrodes E11 include a plurality of first band electrodes E11A and a plurality of second band electrodes E11B. The plurality of first band electrodes E11A are electrically connected to each other, and are configured such that the same voltage (first voltage) is applied to the first band electrodes E11A. The plurality of second band electrodes E11B are electrically connected to each other, and are configured such that the same voltage (second voltage) is applied to the second band electrodes E11B. However, the voltage applied to the second band electrodes E11B is controlled to be different from the voltage applied to the first band electrodes E11A. The first band electrodes E11A and the second band electrodes E11B are alternately arranged along the second direction Y.

The plurality of second electrodes E21 include a plurality of third band electrodes E21A and a plurality of fourth band electrodes E21B. The plurality of third band electrodes E21A are electrically connected to each other, and are configured such that the same voltage (third voltage) is applied to the third band electrodes E21A. The plurality of fourth band electrodes E21B are electrically connected to each other, and are configured such that the same voltage (fourth voltage) is applied to the fourth band electrodes E21B. However, the voltage applied to the fourth band electrodes E21B is controlled to be different from the voltage applied to the third band electrodes E21A. The third band electrodes E21A and the fourth band electrodes E21B are alternately arranged along the first direction X.

Figure 6:
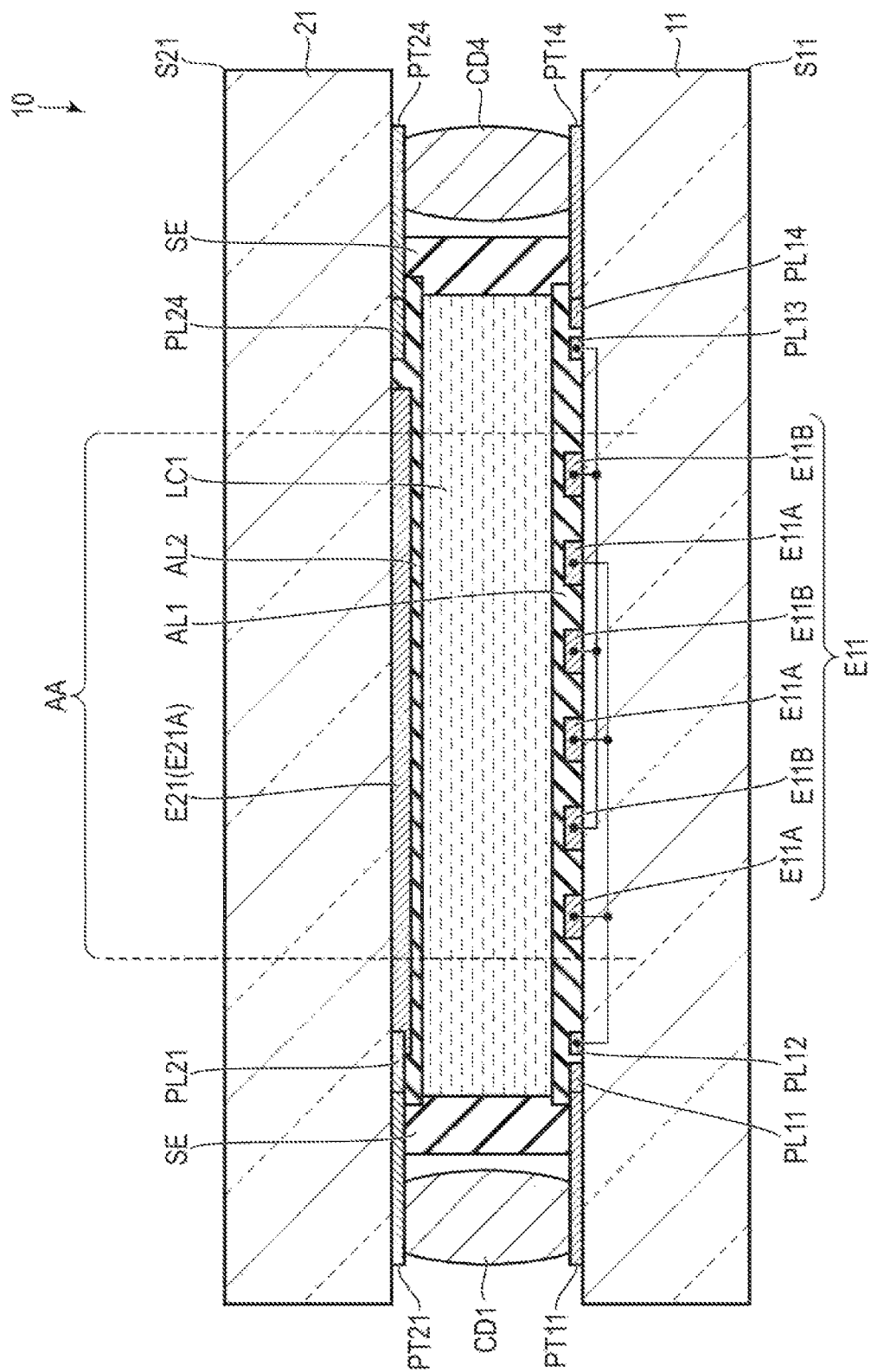
FIG. 6 is a sectional view illustrating a configuration example of the first liquid crystal cell 10.

FIG. 6 is a sectional view illustrating a configuration example of the first liquid crystal cell 10. Although the first liquid crystal cell 10 will be described here, the second liquid crystal cell 20, the third liquid crystal cell 30, and the fourth liquid crystal cell 40 also have the same cross-sectional structure as the first liquid crystal cell 10, and the description thereof will be omitted.

The first liquid crystal cell 10 has an effective region AA capable of scattering incident light. The first substrate S11 and the second substrate S21 are bonded to each other by a sealant SE outside the effective region AA. The liquid crystal layer LC1 is sealed by the sealant SE.

The first substrate S11 includes an insulating substrate 11, the plurality of first electrodes E11 including the first band electrodes E11A and the second band electrodes E11B, a plurality of power supply lines PL11 to PL14, and an alignment film AL1. The plurality of first electrodes E11 and the power supply lines PL11 to PL14 are disposed on the insulating substrate 11 and covered with the alignment film AL1.

The first band electrodes E11A are electrically connected to the power supply line PL12. The second band electrodes E11B are electrically connected to the power supply line PL13. The power supply line PL11 has a power supply terminal PT11 drawn out to the outside of the sealant SE. The power supply line PL14 has a power supply terminal PT14 drawn out to the outside of the sealant SE. The power supply terminals PT11 and PT14 are exposed from the alignment film AL1.

The second substrate S21 includes an insulating substrate 21, the second electrodes E21, a plurality of power supply lines PL21 and PL24, and an alignment film AL2. The second electrodes E21 and the power supply lines PL21 and PL24 are disposed on the insulating substrate 21 and covered with the alignment film AL2. Although only one of the second electrodes E21 orthogonal to the plurality of first electrodes E11 is illustrated here, as described with reference to FIG. 5, the second substrate S21 includes the plurality of second electrodes E21 including the third band electrodes E21A and the fourth band electrodes E21B between the insulating substrate 21 and the alignment film AL2.

Among the second electrodes E21, the third band electrodes E21A are electrically connected to the power supply line PL21. Among the second electrodes E21, the fourth band electrodes E21B (not illustrated) are electrically connected to the power supply line PL24. The power supply line PL21 has a power supply terminal PT21 drawn out to the outside of the sealant SE. The power supply terminal PT21 is located immediately above the power supply terminal PT11. The power supply line PL24 has a power supply terminal PT24 drawn out to the outside of the sealant SE. The power supply terminal PT24 is located immediately above the power supply terminal PT14. The power supply terminals PT21 and PT24 are exposed from the alignment film AL2.

A conductive material CD1 is disposed between the power supply terminal PT11 and the power supply terminal PT21, and electrically connects these two. A conductive material CD2 is disposed between the power supply terminal PT14 and the power supply terminal PT24, and electrically connects these two.

The insulating substrates 11 and 21 are transparent substrates such as glass substrates or flexible resin substrates. The first electrodes E11 and the second electrodes E21 are transparent electrodes formed of a transparent conductive material such as indium tin oxide (ITO) or indium zinc oxide (IZO). The power supply lines PL11 to PL14 and the power supply lines PL21 and PL24 are formed of a metal material such as aluminum, titanium, molybdenum, or tungsten. The power supply lines PL11 to PL14 and the power supply lines PL21 and PL24 may be formed of the same material as the transparent electrodes. The alignment films AL1 and AL2 are horizontal alignment films having an alignment regulating force substantially parallel to the X-Y plane.

Figure 7:
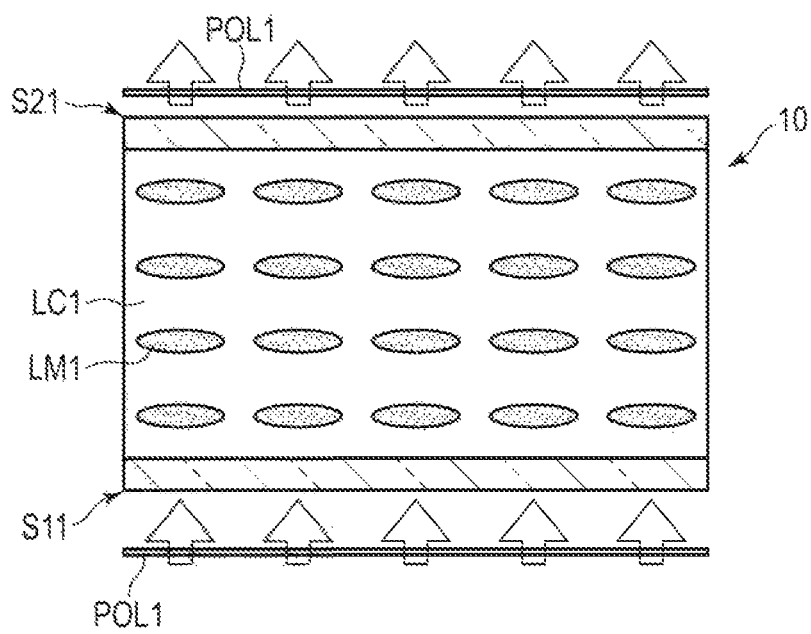
FIG. 7 is a view schematically illustrating the first liquid crystal cell 10 in the off state (OFF) in which an electric field is not formed in the liquid crystal layer LC1.
Figure 8:
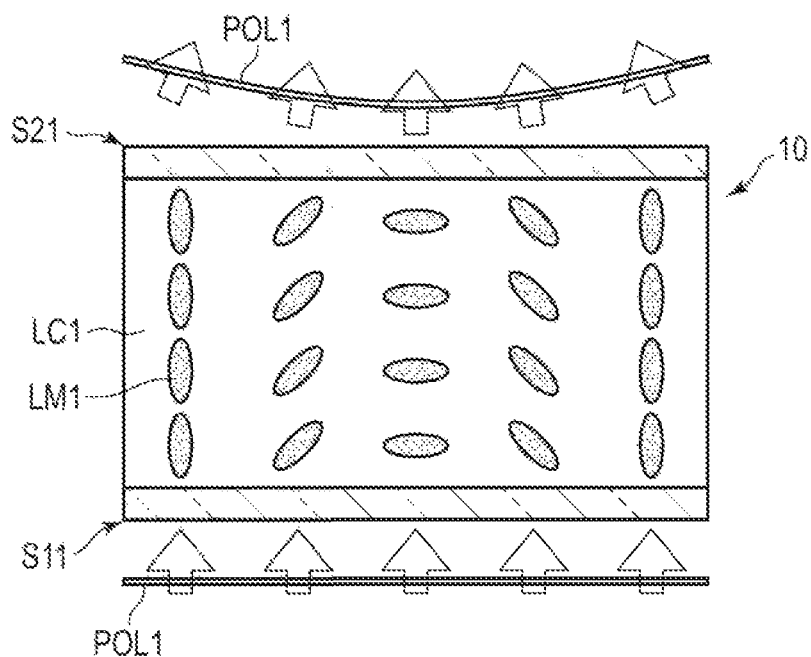
FIG. 8 is a view schematically illustrating the first liquid crystal cell 10 in the on state (ON) in which an electric field is formed in the liquid crystal layer LC1.

Next, an optical action in the first liquid crystal cell 10 will be described with reference to FIGS. 7 and 8. In FIGS. 7 and 8, only configurations necessary for description are illustrated.

FIG. 7 is a diagram schematically illustrating the first liquid crystal cell 10 in the off state (OFF) in which an electric field is not formed in the liquid crystal layer LC1.

In the liquid crystal layer LC1 in the off state, liquid crystal molecules LM1 are initially aligned. The liquid crystal layer LC1 in the off state has a substantially uniform refractive index distribution. Therefore, a first polarization component POL1 that is incident light to the first liquid crystal cell 10 passes through the liquid crystal layer LC1 almost without being refracted (or scattered). Note that the first polarization component POL1 corresponds to, for example, p-polarized light among natural light. In the present specification, s-polarized light orthogonal to the p-polarized light may be referred to as a second polarization component POL2.

FIG. 8 is a view schematically illustrating the first liquid crystal cell 10 in the on state (ON) in which an electric field is formed in the liquid crystal layer LC1.

For example, when the liquid crystal layer LC1 has positive anisotropy of dielectric constant and is in the on state in which an electric field is formed in the liquid crystal layer LC1, the liquid crystal molecules LM1 are aligned such that the major axis thereof is along the electric field. Therefore, as shown in FIG. 8, in the liquid crystal layer LC1, a region in which the liquid crystal molecules LM1 are maintained in the initial alignment state, a region in which the liquid crystal molecules LM1 rise substantially perpendicularly to the substrate, a region in which the liquid crystal molecules LM1 rise obliquely to the substrates, and the like are formed.

The liquid crystal molecules LM1 have refractive index anisotropy $\Delta n$. Therefore, the liquid crystal layer LC1 in the on state has a refractive index distribution or a retardation distribution according to the alignment state of the liquid crystal molecules LM1. The retardation is represented by $\Delta n \cdot d$ when the thickness of the liquid crystal layer LC1 is d.

During the time when the first polarization component POL1 passes through the liquid crystal layer LC1 in the on state, the first polarization component POL1 is scattered under the influence of the refractive index distribution of the liquid crystal layer LC1.

In the configuration in which the first liquid crystal cell 10, the second liquid crystal cell 20, the third liquid crystal cell 30, and the fourth liquid crystal cell 40 are stacked, for example, the first liquid crystal cell 10 and the fourth liquid crystal cell 40 mainly scatter the first polarization component (p-polarized light) POL1 of the natural light, and the second liquid crystal cell 20 and the third liquid crystal cell 30 mainly scatter the second polarization component (s-polarized light) POL2.

Meanwhile, when white light is incident on the liquid crystal layer in which the refractive index distribution is formed, the degree of scattering differs for each wavelength. For this reason, a part of the scattered white light may be colored.

Therefore, in the present embodiment, the refractive index distribution formed in the liquid crystal layer LC1 of the first liquid crystal cell 10 and the refractive index distribution formed in the liquid crystal layer LC4 of the fourth liquid crystal cell 40 are configured to be different from each other. Thus, the degree of scattering of the first polarization component POL1 in the first liquid crystal cell 10 is different from the degree of scattering of the first polarization component POL1 in the fourth liquid crystal cell 40, and coloring of the first polarization component POL1 is suppressed.

Similarly, the refractive index distribution formed in the liquid crystal layer LC2 of the second liquid crystal cell 20 and the refractive index distribution formed in the liquid crystal layer LC3 of the third liquid crystal cell 30 are configured to be different from each other. Thus, the degree of scattering of the second polarization component POL2 in the second liquid crystal cell 20 is different from the degree of scattering of the second polarization component POL2 in the third liquid crystal cell 30, and coloring of the second polarization component POL2 is suppressed.

Next, another liquid crystal device 1 according to the present embodiment will be described.

Figure 9:
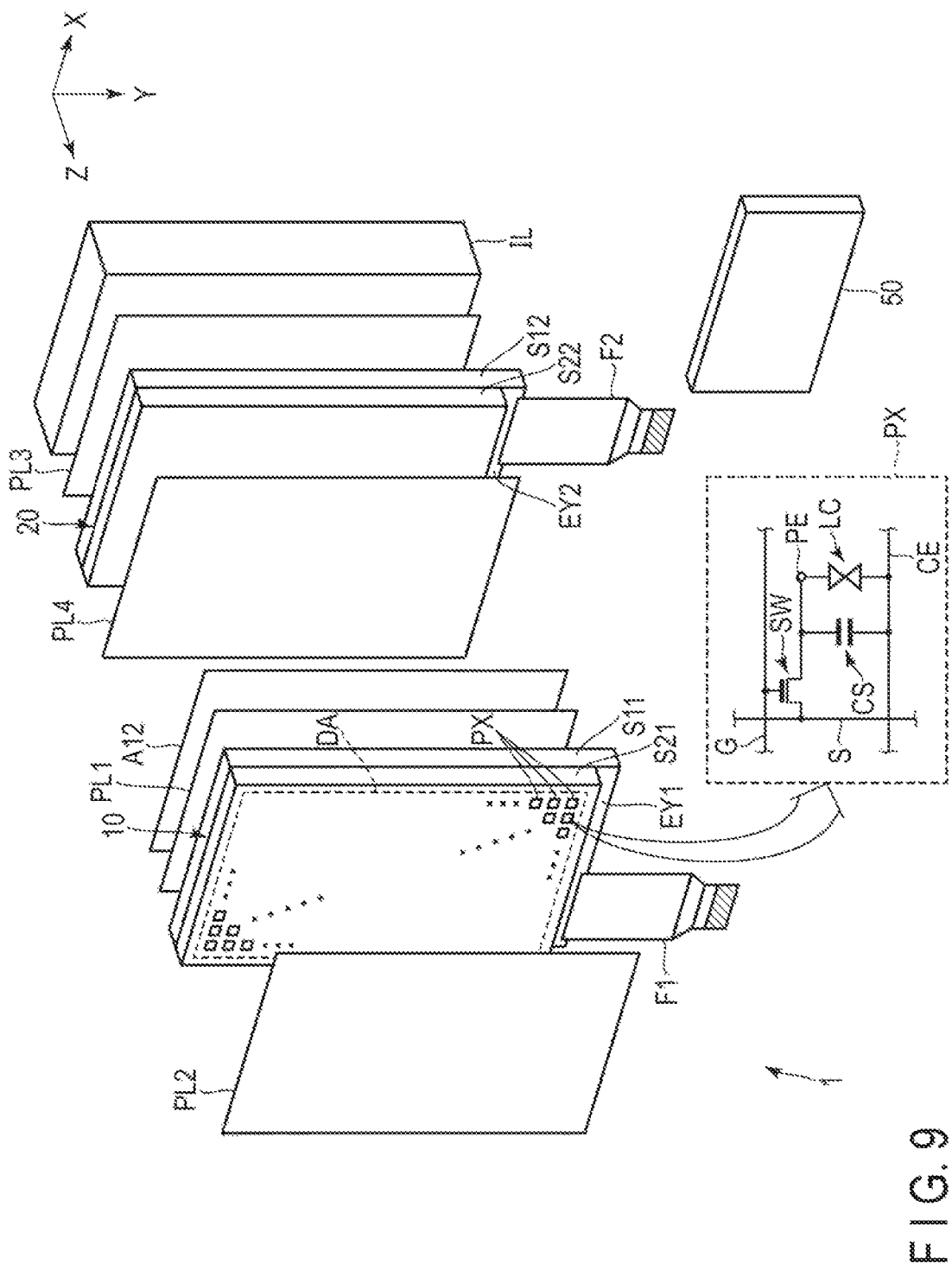
FIG. 9 is an exploded perspective view illustrating another liquid crystal device 1 according to the present embodiment.

FIG. 9 is an exploded perspective view illustrating another liquid crystal device 1 according to the present embodiment. FIG. 9 illustrates a state before each of the first flexible wiring board F1 and the second flexible wiring board F2 is bent.

The liquid crystal device 1 includes a first liquid crystal cell 10, a second liquid crystal cell 20, a first flexible wiring board F1, a second flexible wiring board F2, an illumination device IL, and a circuit board 50.

In the third direction Z, the first liquid crystal cell 10, the second liquid crystal cell 20, and the illumination device IL are sequentially stacked. The first flexible wiring board F1 electrically connects the first liquid crystal cell 10 and the circuit board 50. The second flexible wiring board F2 electrically connects the second liquid crystal cell 20 and the circuit board 50.

The first liquid crystal cell 10 includes a first substrate S11 and a second substrate S21. The first substrate S11 has an extending portion EY1 extending outward from the second substrate S21 along the second direction Y. The first flexible wiring board F1 is connected to the extending portion EY1. A polarizing plate PL1 is bonded to the first substrate S11, and a polarizing plate PL2 is bonded to the second substrate S21.

The second liquid crystal cell 20 includes a first substrate S12 and a second substrate S22. The first substrate S12 has an extending portion EY2 extending outward from the second substrate S22 along the second direction Y. In the third direction Z, the extending portion EY2 overlaps the extending portion EY1. The second flexible wiring board F2 is connected to the extending portion EY2. A polarizing plate PL3 is bonded to the first substrate S12, and a polarizing plate PL4 is bonded to the second substrate S22.

A transparent adhesive layer A12 is disposed between the first liquid crystal cell 10 and the second liquid crystal cell 20. The transparent adhesive layer A12 bonds the polarizing plate PL1 and the polarizing plate PL4.

In plan view of the X-Y plane, the first flexible wiring board F1 and the second flexible wiring board F2 are arranged along the first direction X without overlapping each other. The length of the first flexible wiring board F1 is equal to the length of the second flexible wiring board F2, which will be described later.

Here, the first liquid crystal cell 10 is a color liquid crystal panel for image display, and the second liquid crystal cell 20 is a monochrome liquid crystal panel for dimming. That is, while the first liquid crystal cell 10 includes a color filter, the second liquid crystal cell 20 does not include a color filter. Except for this feature, the first liquid crystal cell 10 and the second liquid crystal cell 20 have substantially the same configuration.

The first liquid crystal cell 10 has a display region DA for displaying an image. The display region DA includes a plurality of pixels PX arrayed in a matrix in the first direction X and the second direction Y. As illustrated in an enlarged manner in FIG. 9, each pixel PX includes a switching element SW, a pixel electrode PE, a common electrode CE, a liquid crystal layer LC1, and the like.

The switching element SW is constituted by, for example, a thin-film transistor (TFT) and is electrically connected to a scanning line G and a signal line S. The scanning line G is electrically connected to the switching element SW in each of the pixels PX arranged in the first direction X. The signal line S is electrically connected to the switching element SW in each of the pixels PX arranged in the second direction Y.

The pixel electrode PE is electrically connected to the switching element SW. Each of the pixel electrodes PE faces the common electrode CE, and the liquid crystal layer LC1 is driven by an electric field generated between the pixel electrode PE and the common electrode CE. A capacitance CS is formed, for example, between an electrode at the same electric potential as the common electrode CE and an electrode at the same electric potential as the pixel electrode PE.

According to the liquid crystal device 1, the second liquid crystal cell 20 controls light from the illumination device IL for each pixel PX to illuminate the first liquid crystal cell 10, so that the contrast ratio of an image displayed on the first liquid crystal cell 10 can be improved.

Figure 10:
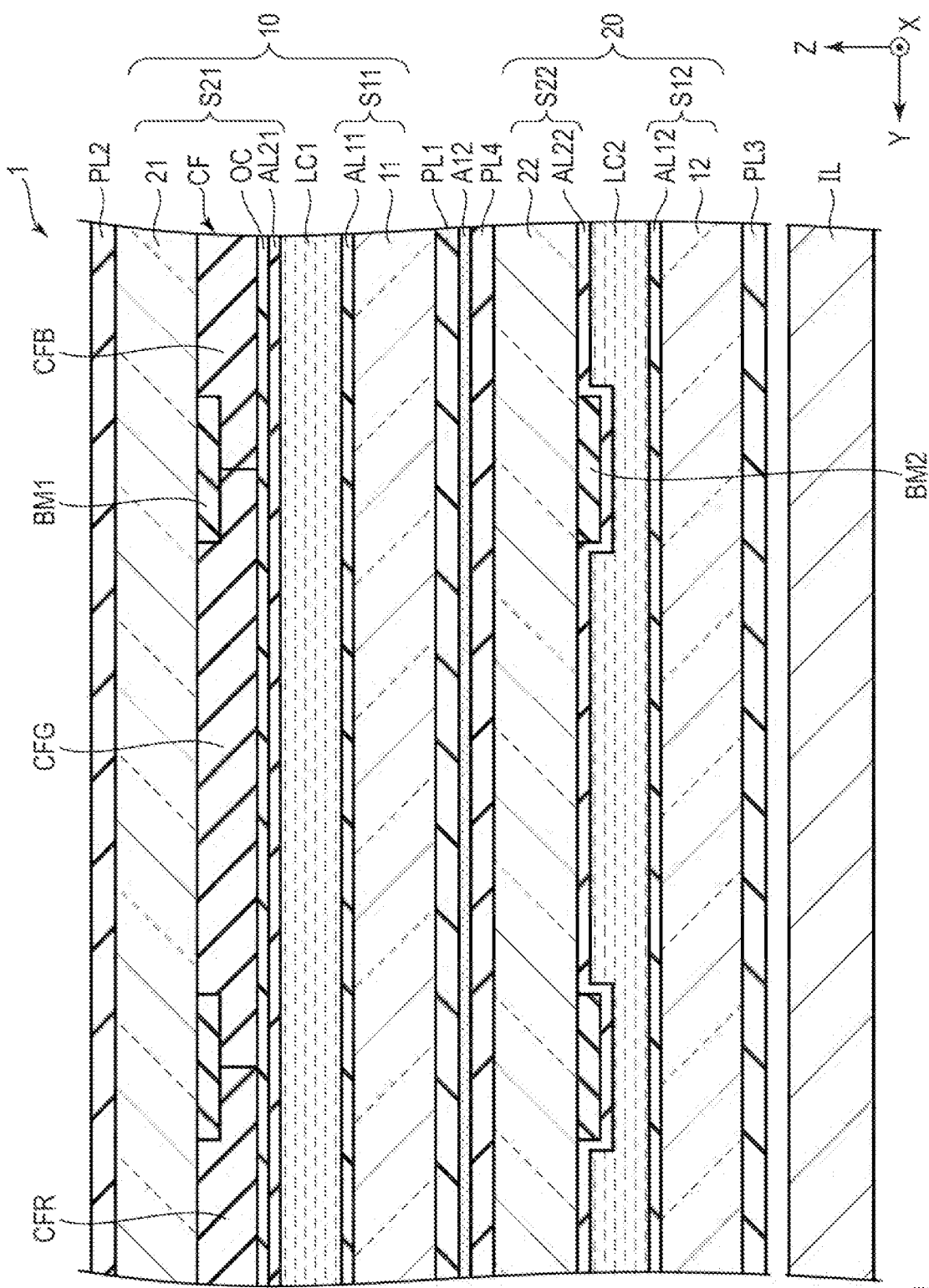
FIG. 10 is a cross-sectional view illustrating another liquid crystal device 1 according to the present embodiment.

FIG. 10 is a cross-sectional view illustrating another liquid crystal device 1 according to the present embodiment.

In the first liquid crystal cell 10, the first substrate S11 includes an insulating substrate 11 and an alignment film AL11. Although not illustrated in FIG. 10, the scanning line G, the signal line S, the switching element SW, the pixel electrode PE, the common electrode CE, and the like illustrated in FIG. 9 are further provided between the insulating substrate 11 and the alignment film AL11.

The second substrate S21 includes an insulating substrate 21, a light shielding film BM1, a color filter layer CF, an overcoat layer OC, and an alignment film AL21. The light shielding film BM1 and the color filter layer CF are provided on the insulating substrate 21. The light shielding film BM1 is located immediately above the scanning line G and the signal line S, and partitions each pixel PX. The color filter layer CF includes a red color filter CFR, a green color filter CFG, and a blue color filter CFB. The overcoat layer OC covers the color filter layer CF. The alignment film AL21 covers the overcoat layer OC.

The liquid crystal layer LC1 is disposed between the first substrate S11 and the second substrate S21, and is in contact with the alignment film AL11 and the alignment film AL21.

In the second liquid crystal cell 20, the first substrate S12 includes an insulating substrate 12 and an alignment film AL12. Although not illustrated in FIG. 10, the scanning line G, the signal line S, the switching element SW, the pixel electrode PE, the common electrode CE, and the like illustrated in FIG. 9 are further provided between the insulating substrate 12 and the alignment film AL12.

The second substrate S22 includes an insulating substrate 22, a light shielding film BM2, and an alignment film AL22. Since the second liquid crystal cell 20 is a panel for dimming, unlike the first liquid crystal cell 10 for image display, the second liquid crystal cell 20 is provided to control brightness (that is, the transmittance of light from the illumination device IL), and does not need to form a color image. Therefore, the color filter layer CF is not provided on the second substrate S22.

The light shielding film BM2 is provided on the insulating substrate 22. The light shielding film BM2 is positioned immediately above the scanning line G and the signal line S, and partitions each pixel PX. Note that the light shielding film BM2 is disposed so as to overlap the light shielding film BM1 in plan view. The alignment film AL22 covers the light shielding film BM2.

The liquid crystal layer LC2 is disposed between the first substrate S12 and the second substrate S22, and is in contact with the alignment film AL12 and the alignment film AL22.

Figure 11:
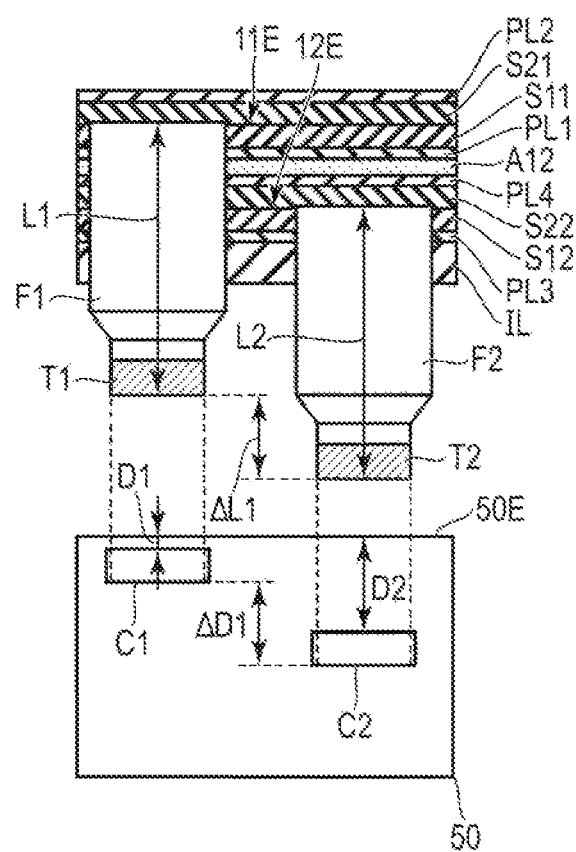
FIG. 11 is a diagram illustrating a state before each of the first flexible wiring board F1 and the second flexible wiring board F2 is connected to the circuit board 50.

FIG. 11 is a diagram illustrating a state before each of the first flexible wiring board F1 and the second flexible wiring board F2 is connected to the circuit board 50.

The first flexible wiring board F1 is bent along the edge 11E of the first substrate S11. The second flexible wiring board F2 is bent along the edge 12E of the first substrate S12.

The first flexible wiring board F1 has a first terminal T1 on the opposite side of the position connected to the first substrate S11. The second flexible wiring board F2 has a second terminal T2 on the opposite side of the position connected to the first substrate S12.

The first flexible wiring board F1 has a length L1 from the position bent along the edge 11E to the distal end of the first terminal T1. The second flexible wiring board F2 has a length L2 from the position bent along the edge 12E to the distal end of the second terminal T2. The length L1 and the length L2 are equal (L1=L2).

Comparing the position of the distal end of the first terminal T1 with the position of the distal end of the second terminal T2, the second terminal T2 is located below the first terminal T1 by the difference ΔL1. The difference ΔL1 generally corresponds to the sum of the thicknesses of the first substrate S11, the polarizing plate PL1, the transparent adhesive layer A12, the polarizing plate PL4, and the second substrate S22.

The circuit board 50 includes a first connector C1 connected to the first terminal T1 and a second connector C2 connected to the second terminal T2.

A first distance D1 from the edge 50E of the circuit board 50 to the first connector C1 and a second distance D2 from the edge 50E to the second connector C2 are different from each other (D1≠D2). The first distance D1 is smaller than the second distance D2 (D1<D2).

Comparing the position of the first connector C1 with the position of the second connector C2, the second connector C2 is located below the first connector C1 by the difference ΔD1. The difference ΔD1 is equal to the difference ΔL1 (ΔD1=ΔL1).

Each of the first flexible wiring board F1 and the second flexible wiring board F2 is bent along the edge 50E of the circuit board 50. The first terminal T1 is connected to the first connector C1, and the second terminal T2 is connected to the second connector C2.

In the liquid crystal device of the present embodiment, the same effects as those described above can be obtained.

Next, a modification of the liquid crystal device 1 in which the four liquid crystal cells are stacked will be described.

Figure 12:
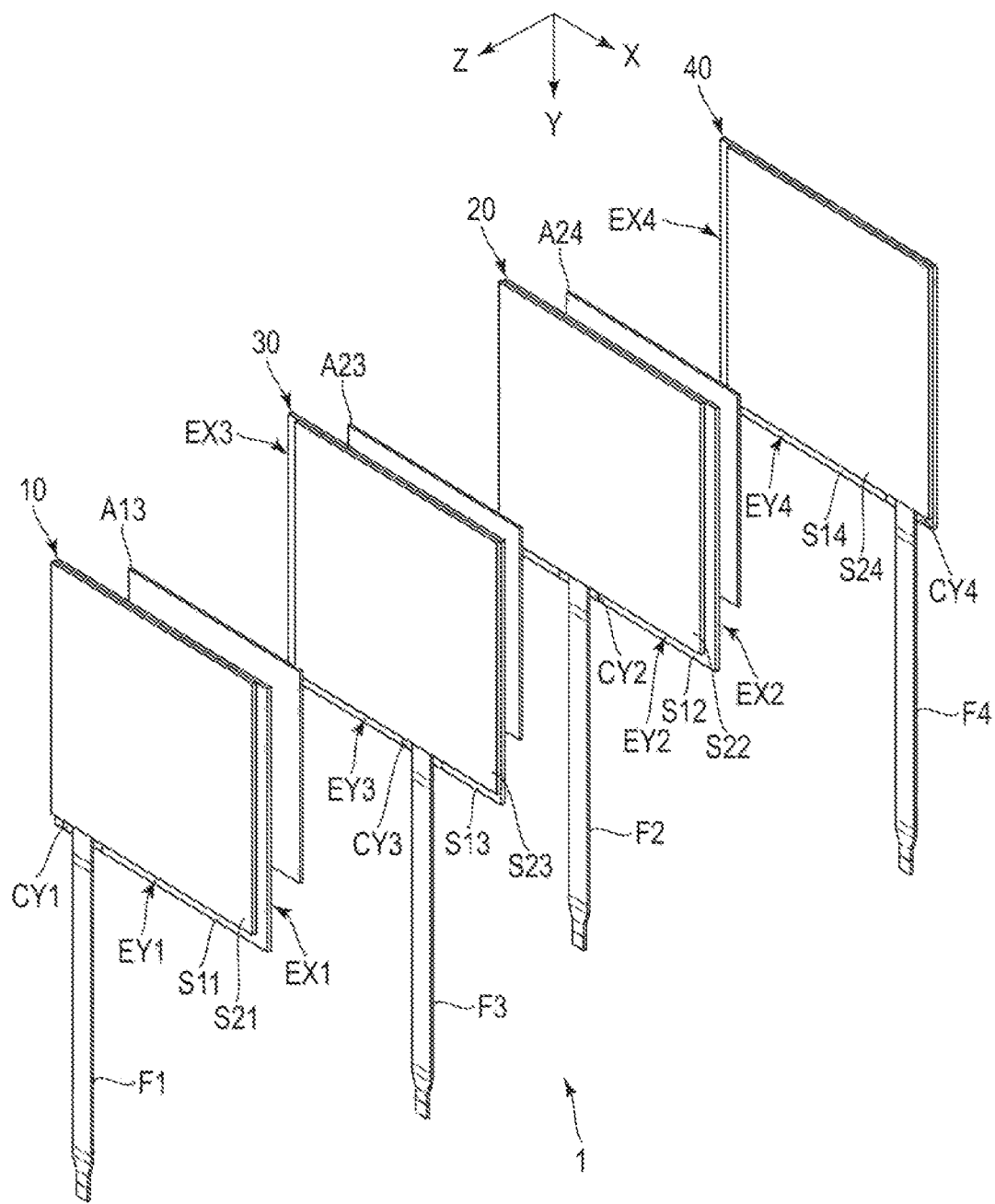
FIG. 12 is an exploded perspective view illustrating another liquid crystal device 1.

FIG. 12 is an exploded perspective view illustrating another liquid crystal device 1. FIG. 12 illustrates a state before each of the first flexible wiring board F1, the second flexible wiring board F2, the third flexible wiring board F3, and the fourth flexible wiring board F4 is bent, and illustration of the circuit board 50 is omitted.

The modification shown in FIG. 12 is different from the example shown in FIG. 2 in that the first liquid crystal cell 10, the third liquid crystal cell 30, the second liquid crystal cell 20, and the fourth liquid crystal cell 40 are stacked in this order in third direction Z. Similarly to the example illustrated in FIG. 3, the second liquid crystal cell 20 and the third liquid crystal cell 30 are mainly configured to scatter a second polarization component (s-polarized light) POL2.

A transparent adhesive layer A13 is disposed between the first liquid crystal cell 10 and the third liquid crystal cell 30. The transparent adhesive layer A13 bonds the first substrate S11 of the first liquid crystal cell 10 and the second substrate S23 of the third liquid crystal cell 30.

A transparent adhesive layer A23 is disposed between the third liquid crystal cell 30 and the second liquid crystal cell 20. The transparent adhesive layer A23 bonds the first substrate S13 of the third liquid crystal cell 30 and the second substrate S22 of the second liquid crystal cell 20.

A transparent adhesive layer A24 is disposed between the second liquid crystal cell 20 and the fourth liquid crystal cell 40. The transparent adhesive layer A24 bonds the first substrate S12 of the second liquid crystal cell 20 and the second substrate S24 of the fourth liquid crystal cell 40.

In plan view of the X-Y plane, the connecting portion CY1, the connecting portion CY2, the connecting portion CY3, and the connecting portion CY4 are arranged in this order along the first direction X without overlapping each other. The first flexible wiring board F1, the second flexible wiring board F2, the third flexible wiring board F3, and the fourth flexible wiring board F4 are arranged in this order along the first direction X without overlapping each other. The first flexible wiring board F1, the second flexible wiring board F2, the third flexible wiring board F3, and the fourth flexible wiring board F4 have the same configuration.

Figure 13:
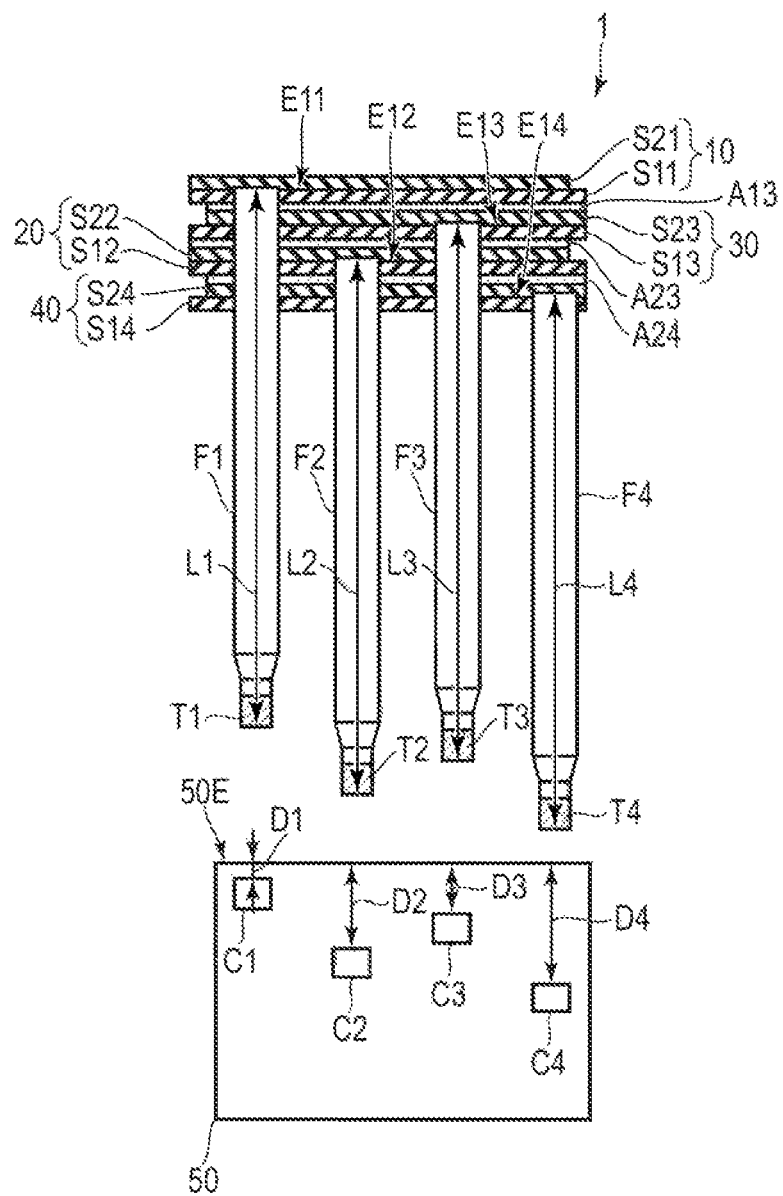
FIG. 13 is a diagram illustrating a state before each of the first flexible wiring board F1, the second flexible wiring board F2, the third flexible wiring board F3, and the fourth flexible wiring board F4 is connected to the circuit board 50.

FIG. 13 is a diagram illustrating a state before each of the first flexible wiring board F1, the second flexible wiring board F2, the third flexible wiring board F3, and the fourth flexible wiring board F4 is connected to the circuit board 50.

The first flexible wiring board F1 is bent along the edge 11E of the first substrate S11. The third flexible wiring board F3 is bent along the edge 13E of the first substrate S13. The second flexible wiring board F2 is bent along the edge 12E of the first substrate S12. The fourth flexible wiring board F4 is bent along the edge 14E of the first substrate S14.

The length L1 of the first flexible wiring board F1, the length L2 of the second flexible wiring board F2, the length L3 of the third flexible wiring board F3, and the length L4 of the fourth flexible wiring board F4 are equal (L1=L2=L3=L4).

The circuit board 50 includes a first connector C1 connected to the first terminal T1 of the first flexible wiring board F1, a second connector C2 connected to the second terminal T2 of the second flexible wiring board F2, a third connector C3 connected to the third terminal T3 of the third flexible wiring board F3, and a fourth connector C4 connected to the fourth terminal T4 of the fourth flexible wiring board F4. The first connector C1, the second connector C2, the third connector C3, and the fourth connector C4 are arranged in this order.

A first distance D1 from the edge 50E of the circuit board 50 to the first connector C1, a second distance D2 from the edge 50E to the second connector C2, a third distance D3 from the edge 50E to the third connector C3, and a fourth distance D4 from the edge 50E to the fourth connector C4 are different from each other (D1≠D2≠D3≠D4). The third distance D3 is larger than the first distance D1, the second distance D2 is larger than the third distance D3, and the fourth distance D4 is larger than the second distance D2 (D1<D3<D2<D4).

As described with reference to FIG. 1, the edge 50E as a reference corresponds to an edge serving as a starting point of bending of each of the first flexible wiring board F1, the second flexible wiring board F2, the third flexible wiring board F3, and the fourth flexible wiring board F4 among the edges of the circuit board 50.

As illustrated, when the first connector C1, the second connector C2, the third connector C3, and the fourth connector C4 are arranged at regular intervals, the first connector C1, the second connector C2, the third connector C3, and the fourth connector C4 are arranged in a staggered manner.

Figure 14:
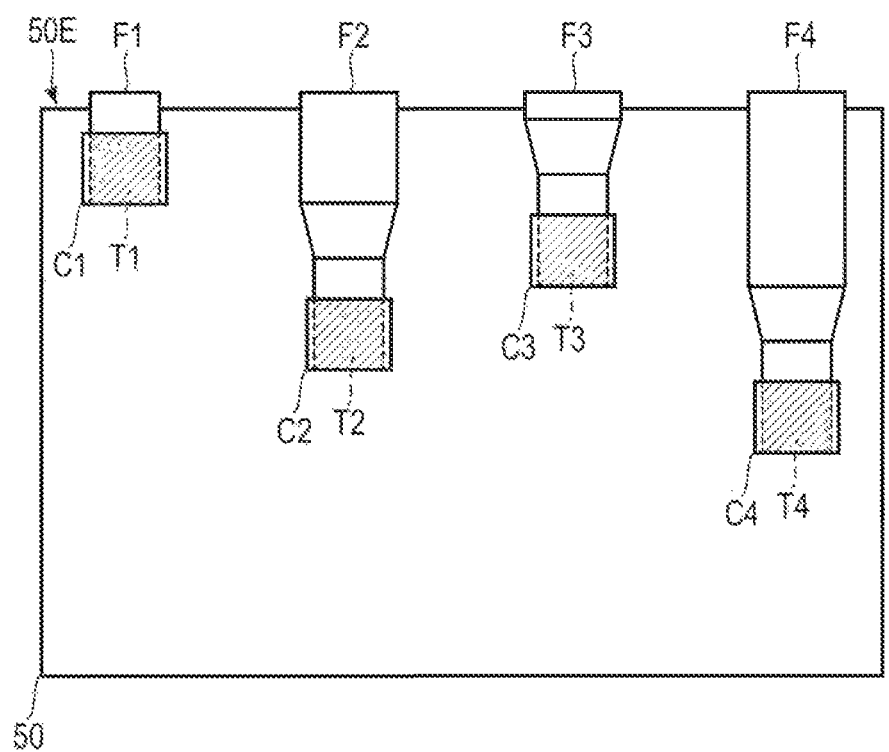
FIG. 14 is a diagram illustrating a state in which each of the first flexible wiring board F1, the second flexible wiring board F2, the third flexible wiring board F3, and the fourth flexible wiring board F4 is connected to the circuit board 50.

FIG. 14 is a diagram illustrating a state in which each of the first flexible wiring board F1, the second flexible wiring board F2, the third flexible wiring board F3, and the fourth flexible wiring board F4 is connected to the circuit board 50.

Each of the first flexible wiring board F1, the second flexible wiring board F2, the third flexible wiring board F3, and the fourth flexible wiring board F4 is bent along the edge 50E of the circuit board 50.

The first terminal T1 is connected to the first connector C1. The second terminal T2 is connected to the second connector C2. The third terminal T3 is connected to the third connector C3. The fourth terminal T4 is connected to the fourth connector C4.

Also in the modification, the same effects as those described above can be obtained. That is, regarding the circuit board 50, the looseness of each of the first flexible wiring board F1, the second flexible wiring board F2, the third flexible wiring board F3, and the fourth flexible wiring board F4 is suppressed as compared with the case where the first connector C1, the second connector C2, the third connector C3, and the fourth connector C4 are disposed at equal distances from the edge 50E. Therefore, stress applied from each flexible wiring board to the connecting portion of the liquid crystal cell is relieved, and the reliability can be improved.

In addition, as compared with the case where a plurality of types of flexible wiring boards having different specifications (in particular, lengths) are prepared, the cost can be reduced, and a connection error between the flexible wiring boards and the liquid crystal cells can be prevented.

As described above, according to the present embodiment, it is possible to provide a liquid crystal device capable of improving reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal device comprising:
a first liquid crystal cell;
a second liquid crystal cell bonded to the first liquid crystal cell;
a first flexible wiring board including a first terminal and connected to the first liquid crystal cell;
a second flexible wiring board including a second terminal and connected to the second liquid crystal cell; and
a circuit board including a first connector connected to the first terminal and a second connector connected to the second terminal, wherein
the first flexible wiring board and the second flexible wiring board are arranged without overlapping each other in plan view,
a length of the first flexible wiring board is equal to a length of the second flexible wiring board, and
a first distance from an edge of the circuit board to the first connector and a second distance from the edge to the second connector are different from each other.

2. The liquid crystal device according to claim 1, wherein the circuit board faces the second liquid crystal cell, and the first distance is smaller than the second distance.

3. A liquid crystal device comprising:
a first liquid crystal cell;
a second liquid crystal cell bonded to the first liquid crystal cell;
a third liquid crystal cell bonded to the second liquid crystal cell;
a fourth liquid crystal cell bonded to the third liquid crystal cell;
a first flexible wiring board including a first terminal and connected to the first liquid crystal cell;
a second flexible wiring board including a second terminal and connected to the second liquid crystal cell;
a third flexible wiring board including a third terminal and connected to the third liquid crystal cell;
a fourth flexible wiring board including a fourth terminal and connected to the fourth liquid crystal cell; and
a circuit board including a first connector connected to the first terminal, a second connector connected to the second terminal, a third connector connected to the third terminal, and a fourth connector connected to the fourth terminal, wherein
the first flexible wiring board, the second flexible wiring board, the third flexible wiring board, and the fourth flexible wiring board are arranged in this order without overlapping each other in plan view,
a length of the first flexible wiring board, a length of the second flexible wiring board, a length of the third flexible wiring board, and a length of the fourth flexible wiring board are equal to each other, and
a first distance from an edge of the circuit board to the first connector, a second distance from the edge to the second connector, a third distance from the edge to the third connector, and a fourth distance from the edge to the fourth connector are different from each other.

4. The liquid crystal device according to claim 3, wherein the circuit board faces the fourth liquid crystal cell, the first distance is smaller than the second distance, the second distance is smaller than the third distance, and the third distance is smaller than the fourth distance.

5. The liquid crystal device according to claim 4, wherein,
each of the first liquid crystal cell, the second liquid crystal cell, the third liquid crystal cell, and the fourth liquid crystal cell includes:
a first substrate including a plurality of first electrodes formed in a band shape;
a second substrate including a plurality of second electrodes formed in a band shape; and
a liquid crystal layer held between the first substrate and the second substrate, and
the first electrodes and the second electrodes intersect each other.

6. The liquid crystal device according to claim 5, wherein
the first electrodes of the first liquid crystal cell and the first electrodes of the fourth liquid crystal cell are orthogonal to each other, and
the first electrodes of the second liquid crystal cell and the first electrodes of the third liquid crystal cell are orthogonal to each other.

7. The liquid crystal device according to claim 6, wherein in each of the first liquid crystal cell, the second liquid crystal cell, the third liquid crystal cell, and the fourth liquid crystal cell, the first substrate is formed in a square shape and has an equivalent size.

8. The liquid crystal device according to claim 7, wherein
the first electrodes include a plurality of first band electrodes configured to apply a same first voltage and a plurality of second band electrodes configured to apply a same second voltage, the first voltage is different from the second voltage, and the first band electrodes and the second band electrodes are alternately arranged, and
the second electrodes include a plurality of third band electrodes configured to apply a same third voltage and a plurality of fourth band electrodes configured to apply a same fourth voltage, the third voltage is different from the fourth voltage, and the third band electrodes and the fourth band electrodes are alternately arranged.

9. A liquid crystal device comprising:
a first liquid crystal cell;
a third liquid crystal cell bonded to the first liquid crystal cell;
a second liquid crystal cell bonded to the third liquid crystal cell;
a fourth liquid crystal cell bonded to the second liquid crystal cell;
a first flexible wiring board including a first terminal and connected to the first liquid crystal cell;
a second flexible wiring board including a second terminal and connected to the second liquid crystal cell;
a third flexible wiring board including a third terminal and connected to the third liquid crystal cell;
a fourth flexible wiring board including a fourth terminal and connected to the fourth liquid crystal cell; and
a circuit board including a first connector connected to the first terminal, a second connector connected to the second terminal, a third connector connected to the third terminal, and a fourth connector connected to the fourth terminal, wherein
the first flexible wiring board, the second flexible wiring board, the third flexible wiring board, and the fourth flexible wiring board are arranged in this order without overlapping each other,
a length of the first flexible wiring board, a length of the second flexible wiring board, a length of the third flexible wiring board, and a length of the fourth flexible wiring board are equal to each other,
the first connector, the second connector, the third connector, and the fourth connector are arranged in this order,
a third distance from an edge of the circuit board to the third connector is larger than a first distance from the edge to the first connector,
a second distance from the edge to the second connector is larger than the third distance, and
a fourth distance from the edge to the fourth connector is larger than the second distance.

10. The liquid crystal device according to claim 9, wherein
each of the first liquid crystal cell, the second liquid crystal cell, the third liquid crystal cell, and the fourth liquid crystal cell includes:
a first substrate including a plurality of first electrodes formed in a band shape;
a second substrate including a plurality of second electrodes formed in a band shape; and
a liquid crystal layer held between the first substrate and the second substrate, and
the first electrodes and the second electrodes intersect each other.

11. The liquid crystal device according to claim 10, wherein
the first electrodes of the first liquid crystal cell and the first electrodes of the fourth liquid crystal cell are orthogonal to each other, and
the first electrodes of the second liquid crystal cell and the first electrodes of the third liquid crystal cell are orthogonal to each other.

12. The liquid crystal device according to claim 10, wherein in each of the first liquid crystal cell, the second liquid crystal cell, the third liquid crystal cell, and the fourth liquid crystal cell, the first substrate is formed in a square shape and has an equivalent size.

13. The liquid crystal device according to claim 12, wherein
the first electrodes include a plurality of first band electrodes configured to apply a same first voltage and a plurality of second band electrodes configured to apply a same second voltage, the first voltage is different from the second voltage, and the first band electrodes and the second band electrodes are alternately arranged, and
the second electrodes include a plurality of third band electrodes configured to apply a same third voltage and a plurality of fourth band electrodes configured to apply a same fourth voltage, the third voltage is different from the fourth voltage, and the third band electrodes and the fourth band electrodes are alternately arranged.

* * * * *